United States Patent
Saito et al.

(10) Patent No.: US 6,417,935 B1
(45) Date of Patent: Jul. 9, 2002

(54) COMMUNICATION APPARATUS

(75) Inventors: Hitoshi Saito, Yokohama; Toru Maeda, Mitaka; Masanori Momose, Tokyo; Toru Fujino, Urawa; Shinichiro Kohri; Makoto Kobayashi, both of Kawasaki; Kazuhiro Sugawara, Tokyo; Satoshi Imai, Koganei; Naomi Nakamura, Kawaguchi; Yasushi Morimoto, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/715,899

(22) Filed: Sep. 19, 1996

(30) Foreign Application Priority Data

Sep. 20, 1995 (JP) ............................................. 7-264711
Oct. 11, 1995 (JP) ............................................. 7-288205

(51) Int. Cl.$^7$ ............................ H04N 1/387; H04N 1/00

(52) U.S. Cl. ...................................... 358/450; 358/434

(58) Field of Search ................................ 358/434, 435, 358/436, 438, 439, 450, 449, 451, 452, 453, 442, 404, 444, 468; 379/100.01, 100.13, 102.01, 106.01

(56) References Cited

U.S. PATENT DOCUMENTS

| | | | | |
|---|---|---|---|---|
| 4,947,260 A | * | 8/1990 | Reed et al. ................. | 358/447 |
| 4,984,279 A | * | 1/1991 | Kidney et al. ................ | 382/1 |
| 5,153,936 A | * | 10/1992 | Morris et al. ................ | 395/128 |
| 5,247,372 A | * | 9/1993 | Tsutamori et al. .......... | 358/452 |
| 5,357,348 A | * | 10/1994 | Moro .......................... | 358/450 |
| 5,450,213 A | * | 9/1995 | Kobori et al. ............... | 358/450 |
| 5,528,732 A | * | 6/1996 | Klotz, Jr. .................... | 395/106 |
| 5,694,486 A | * | 12/1997 | Shigeeda et al. ............ | 382/197 |
| 5,719,685 A | * | 2/1998 | Kimura et al. ............... | 358/401 |
| 5,732,230 A | * | 3/1998 | Cullen et al. ................ | 395/339 |
| 5,777,753 A | * | 7/1998 | McShane et al. ........... | 358/450 |

* cited by examiner

Primary Examiner—Madeleine Nguyen
(74) Attorney, Agent, or Firm—Fitzpatrick, Cella, Harper & Scinto (57) ABSTRACT

When a plurality of pages of image data are combined into one page of image data for transmission, the direct combination of the image data having different resolutions and the resulting recording of the image data on one record sheet while the image is partially expanded or reduced are prevented. In combining two pages of image data into one page of image data for transmission within a range in which the number of read lines of read image data does not exceed the number of available lines for recording per page at a transmission destination terminal, if the read resolutions of both image data are equal, the two pages of image data are combined into one page of image data for transmission, and if the read resolutions are different, the combination is not conducted and the image data of the respective pages are transmitted as the independent pages of image data.

A facsimile apparatus minimizes the possibility of transmission disable due to a full state of a memory when a plurality of pages of image data having short sub-scan lengths stored in the memory are transmitted. The image data acquired by reading a document sheet by a contact sensor 13 is compression-coded by an encoder 103 of a read/write codec device 10 and it is stored in an image memory 6. After a plurality of pages of image data having short sub-scan lengths have been stored in the image memory 6, the image data are combined into one page of image data on a communication protocol and it is transmitted to a transmission destination apparatus through a modem 17 and a network control unit 18. When it is detected that a remaining capacity of the image memory 6 is small, the combination transmission of the image data is canceled and the image data stored in the image memory 6 is immediately read and transmitted.

12 Claims, 8 Drawing Sheets

COMMUNICATION APPARATUS

BACKGROUND OF THE INVENTION

1. Field of the Invention

The present invention relates to a communication apparatus, and more particularly to communication apparatus and communication method having a memory transmission function to transmit input image data after having temporarily stored the image data.

2. Related Background Art

A facsimile apparatus has been known as a communication apparatus.

Recently, since it has been common in the facsimile apparatus to use a roll paper as a record sheet, a sending station transmits image data read from one sheet of document sheet as one page of image data without regard to a length of the image data along a sub-scan direction of the read document sheet.

However, recently, cut sheets are frequently used as record sheets. When a document sheet which is shorter in length than the cut sheet is to be transmitted and when the image data read from one sheet of document sheet is transmitted as one page of image data without regard to the sub-scan direction length of the image data of the read document sheet as it is in the prior art, the image data is recorded only in an upper portion of the cut sheet at a receiving station and a large blank area is left at a bottom portion and the record sheet is wasted. In addition, when received multi-page image data is to be recorded, it is necessary to feed the sheets for the blank areas and it damages the speed of record and increases a running cost.

Figure 8:
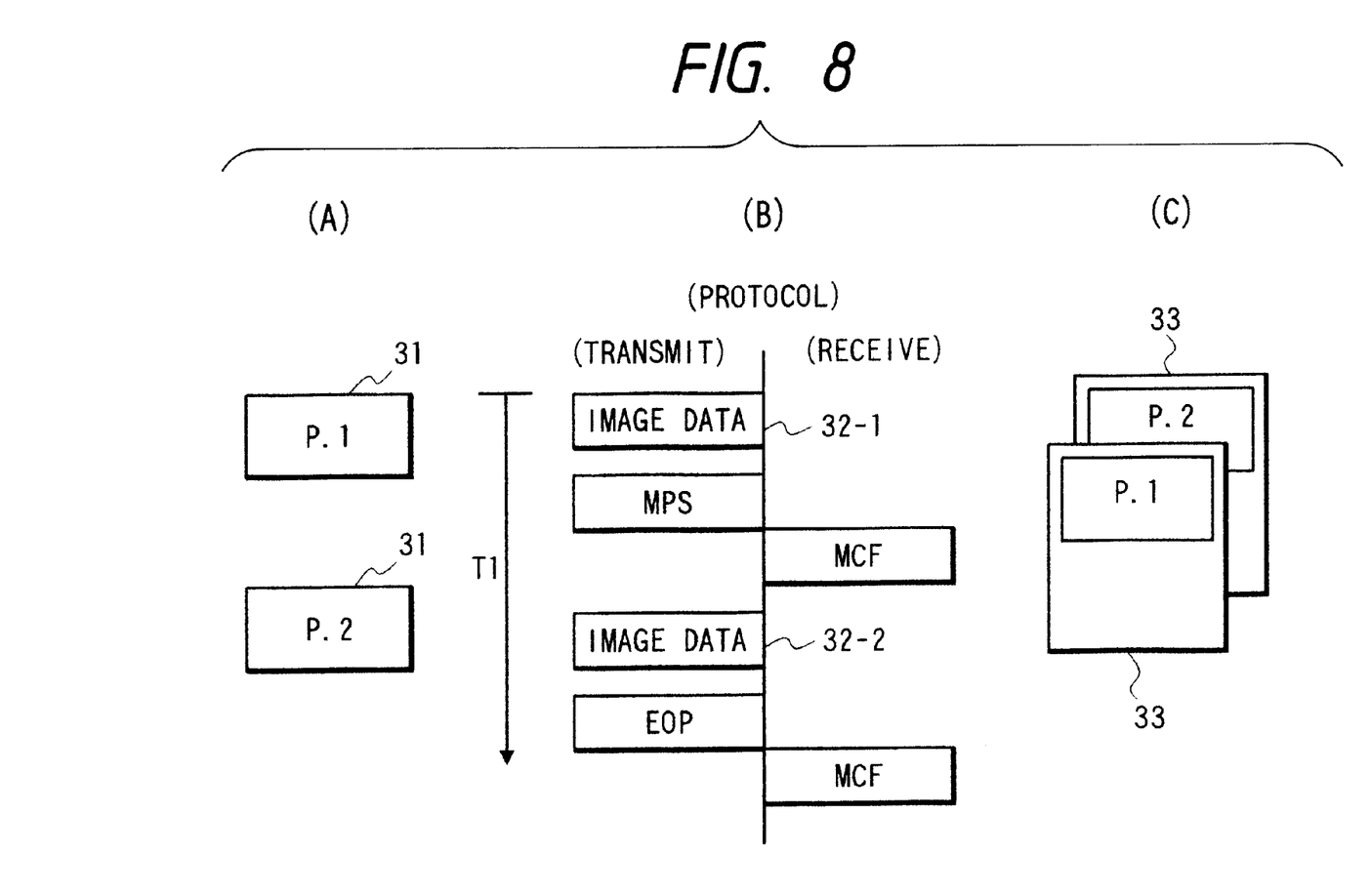
FIG. 8 illustrates an operation of the memory transmission in a prior art facsimile apparatus.

A prior art facsimile apparatus has a memory transmission function to read multi-page document sheet images, temporarily store the read image data and transmit the stored image data of the memory to a predetermined destination station. In such a memory transmission function, image data of P1 and P2 of a document sheet 31 as shown in (A) in FIG. 8 is read, stored in a memory page by page, and the stored image data is transmitted page by page by a communication protocol shown in (B) in FIG. 8. In this communication protocol, the image data 32-1 corresponds to the image of P1 and the image data 32-2 corresponds to the image of P2, and the image data is transmitted serially page by page by the communication protocol.

As a result, even if the sub-scan direction length of the images drawn on P1 and P2 of the transmission document sheet 31 is short and the amount of images of the two pages is less than the amount of image of one page of the cut sheet as shown in (C) in FIG. 8, blank areas are created on P1 and P2 of the received document sheet 33 if the destination station apparatus receives the image while using the cut record sheets and the received document sheets are wasted.

Further, since the P1 and P2 having small amount of data per page are serially transmitted page by page, the over all communication time T1 is increased by a page-to-page communication protocol, that is, by protocol for MPS (multi-page signal) and MCF (message confirmation) and the communication efficiency is lowered accordingly.

In order to solve the above problems, it has been proposed (U.S. patent application Ser. No. 08/691,680) to store image data inputted by a CCD scanner in a memory, determine the number of lines available for recording per page while taking size information of the record sheet acquired from the receiving station into consideration, combine continuous multiple pages of image data within the range of the number of available lines for recording and transmit it as one page of image data.

The proposed system is outlined below.

Figure 9:
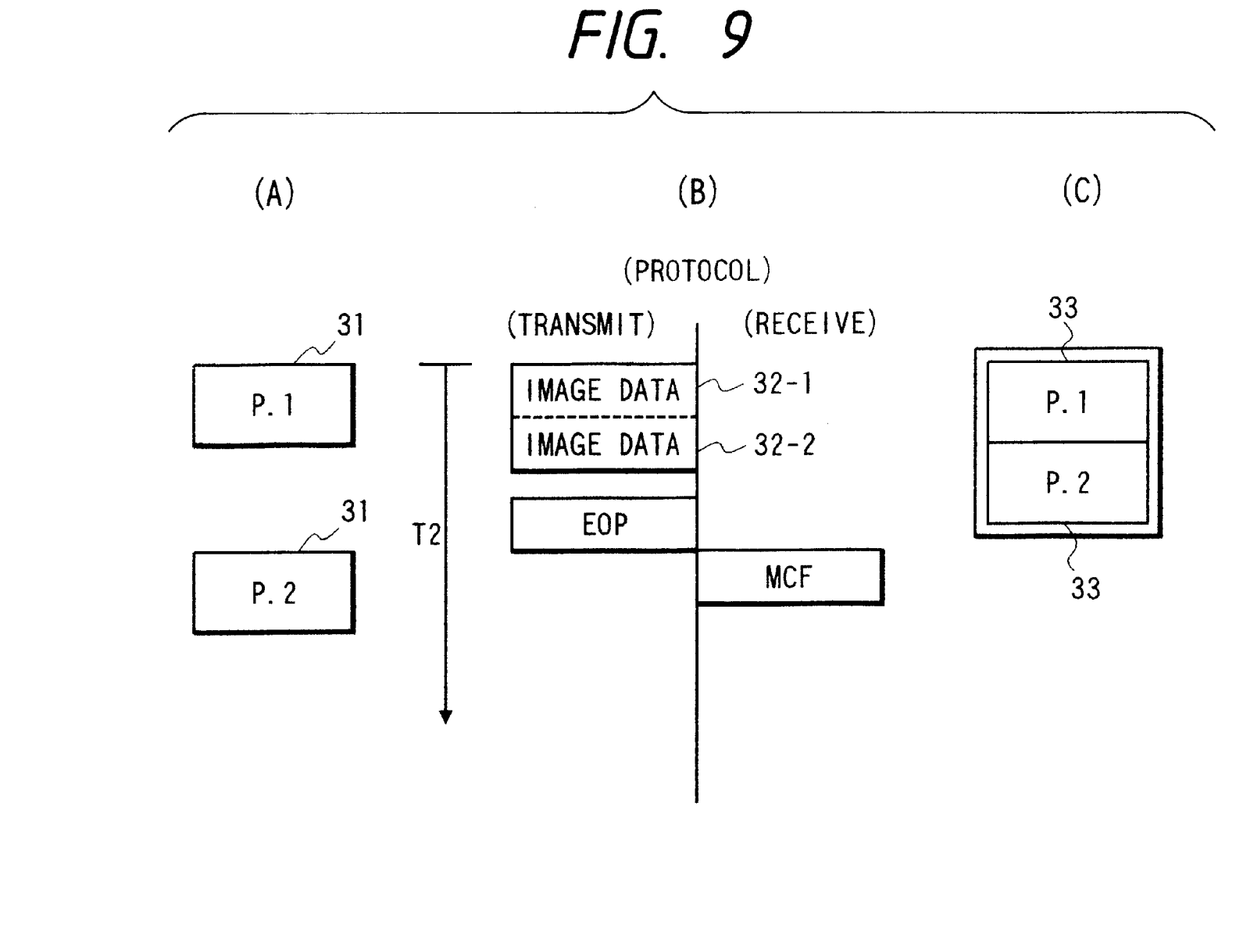
FIG. 9 illustrates an operation of combination transmission for combining a plurality of image data into one page for transmission in a prior art facsimile apparatus.

When continuous pages of image data having short sub-scan length as shown by P1 and P2 of a document sheet 31 of (A) in FIG. 9 is stored in a memory for transmission, the read data 32-1 and 32-2 of P1 and P2 of the document sheet 31 as shown in (B) in FIG. 9 are combined in terms of communication protocol into one page of image data, which is transmitted to the destination station apparatus. Thus, the communication protocol required between pages is omitted to shorten the communication time T2, and even if the receiving station apparatus uses the cur sheets as shown in (C) in FIG. 9, one page of received document sheet free of blank is acquired. It should be noted that the communication time T1 shown in FIG. 8 is longer than the communication time T2 shown in FIG. 9.

In this method, the record sheets may be saved and the rapid recording is attained so that the running cost is reduced, but when the multiple page of image data having different resolutions are combined and transmitted, they are recorded in different status from that of the original images at the receiving station.

Specifically, it is assumed that a first page of image data is read and stored at a standard resolution (3.85 lines/mm) and a second page of image data is read and stored at a high resolution (7.7 lines/mm), and those two pages of image data are combined and transmitted by declaring a standard resolution as a transmission resolution. In this case, since the receiving station decodes the two pages of image data as one page of image data and records it, the first page of image data is stored normally but the second page of image data is recorded while it is stretched by a factor of two in the sub-scan direction.

Conversely, when the high resolution is declared as the transmission resolution, the second page of image data are transmitted normally but the first page of image data is recorded while it is reduced to by a factor of ½.

A prior art facsimile apparatus stores one page of read image data in a memory, reads the image data stored in the memory for transmission, erases the transmitted page of image data and stores newly read page of image data in the memory space in which the erased page of image data has been stored.

When multiple page of read image data are to be combined into the page for transmission in such a system, the following problems occurs.

First, before the reading of the last page of the image data of the transmission document sheet into the memory is completed, the transmission of the image data already stored in the memory is started. When the image data of the short sub-scan length page is then read into the memory, the image data of this page might be combined with the image data of the next page so that the process waits until the reading of the image data of the next page into the memory is completed, and then the sub-scan lengths of the image data of the both pages are summed. If the total sub-scan length is within a predetermined length, the both image data are combined into one page of image data for transmission to the destination station, and after the completion of the transmission, the transmitted one page of image data is erased from the memory. However, when an available capacity remaining in the memory (hereinafter simply referred to as a remaining capacity) is small, the memory becomes full during the reading of the image data of the next page and the image data of less than one page might be transmitted.

Namely, in order to assure the transmission of the image data of the short sub-scan length page by combining it with the image data of the next page as one page of image data, it is required to wait for the determination of the sub-scan length of the image data of the next page to be read next. Thus, when the remaining memory capacity is small, the memory becomes full and the length of the image data of the next page is not determined so that the transmission is not attained.

SUMMARY OF THE INVENTION

It is an object of the present invention to improve a communication apparatus and a communication method.

It is another object of the present invention to improve a facsimile apparatus and a facsimile communication method.

It is still another object of the present invention to prevent image data of different resolutions from being directly combined and recorded on one record sheet while it is partially expanded or reduced.

It is still another object of the present invention to provide a facsimile apparatus which shortens the communication time by combining multiple pages of image data having a short sub-scan length, stored in a memory, into one page of image data for transmission while minimizing a possibility of the memory transmission disable due to the memory full.

DETAILED DESCRIPTION OF THE PREFERRED EMBODIMENTS

Embodiments of the present invention are now explained with reference to the drawings by explaining a facsimile apparatus as an example of the communication apparatus.

[Embodiment 1]

Figure 1:
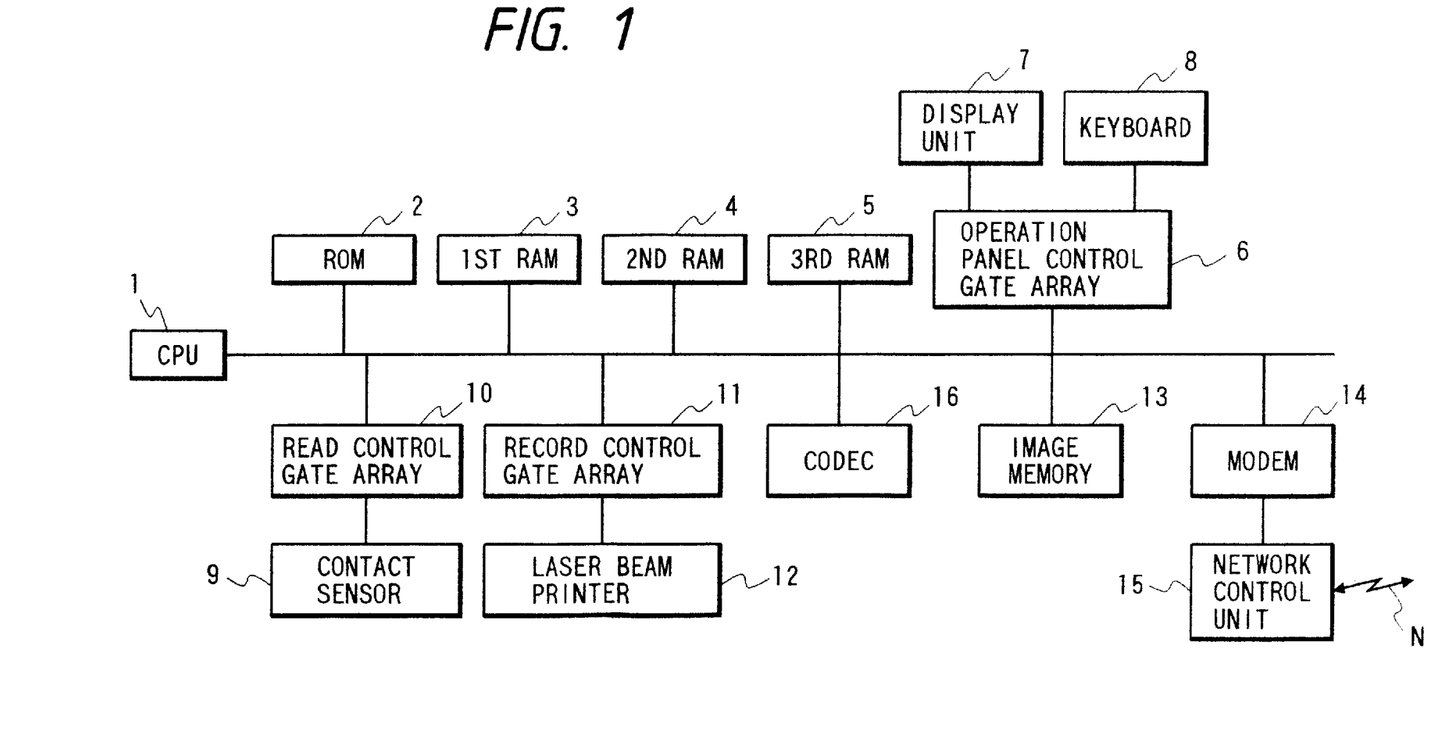
FIG. 1 shows a block diagram of a configuration of a facsimile apparatus in accordance with an embodiment of the present invention.

FIG. 1 shows a block diagram of a facsimile apparatus in accordance with an embodiment of the present invention.

The facsimile apparatus conducts various processes relating to the facsimile transmission by using a CPU (central processing unit) 1 as a main unit. Connected to the CPU 1 are a ROM (read-only memory) 2, first, second and third RAMs (random access memories) 3, 4 and 5, an operation panel control gate array 6, a read control gate array 10, a record control gate array 11, an image memory 13 (comprising DRAM), a modem 14 and a codec 16. While not shown, the codec 16 comprises a coder, a multiplexor, a demultipulexor and a decoder.

A display 7 and a keyboard 8 are connected to the operation panel control gate array 6, a contact sensor 9 is connected to the read control gate array 10, a laser beam printer 12 is connected to the record control gate array 11 and a network control unit 15 is connected to the modem 14. N denotes a public line.

Figure 4:
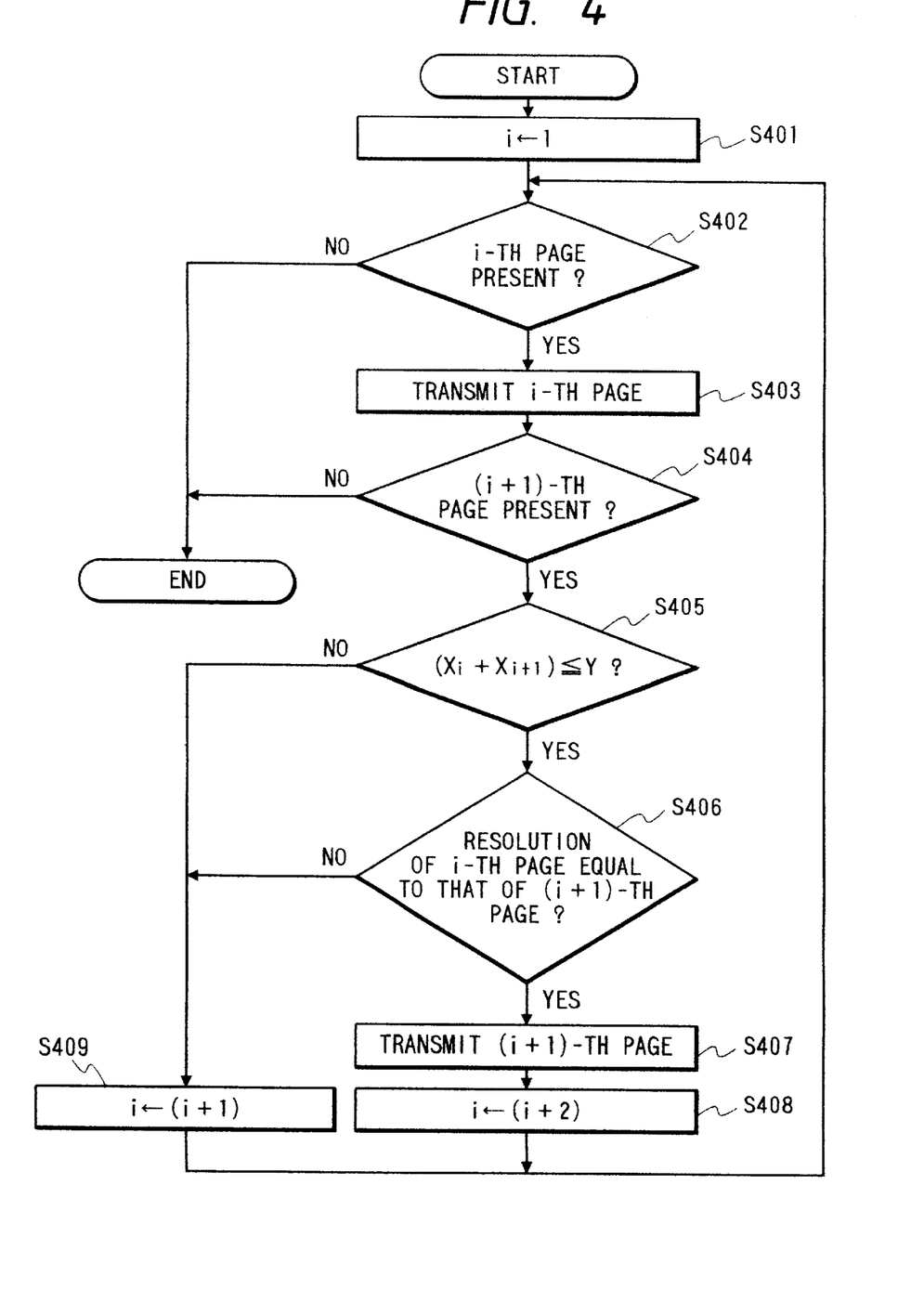
FIG. 4 shows a flow chart of a memory transmission process in a first embodiment of the present invention.
Figure 5:
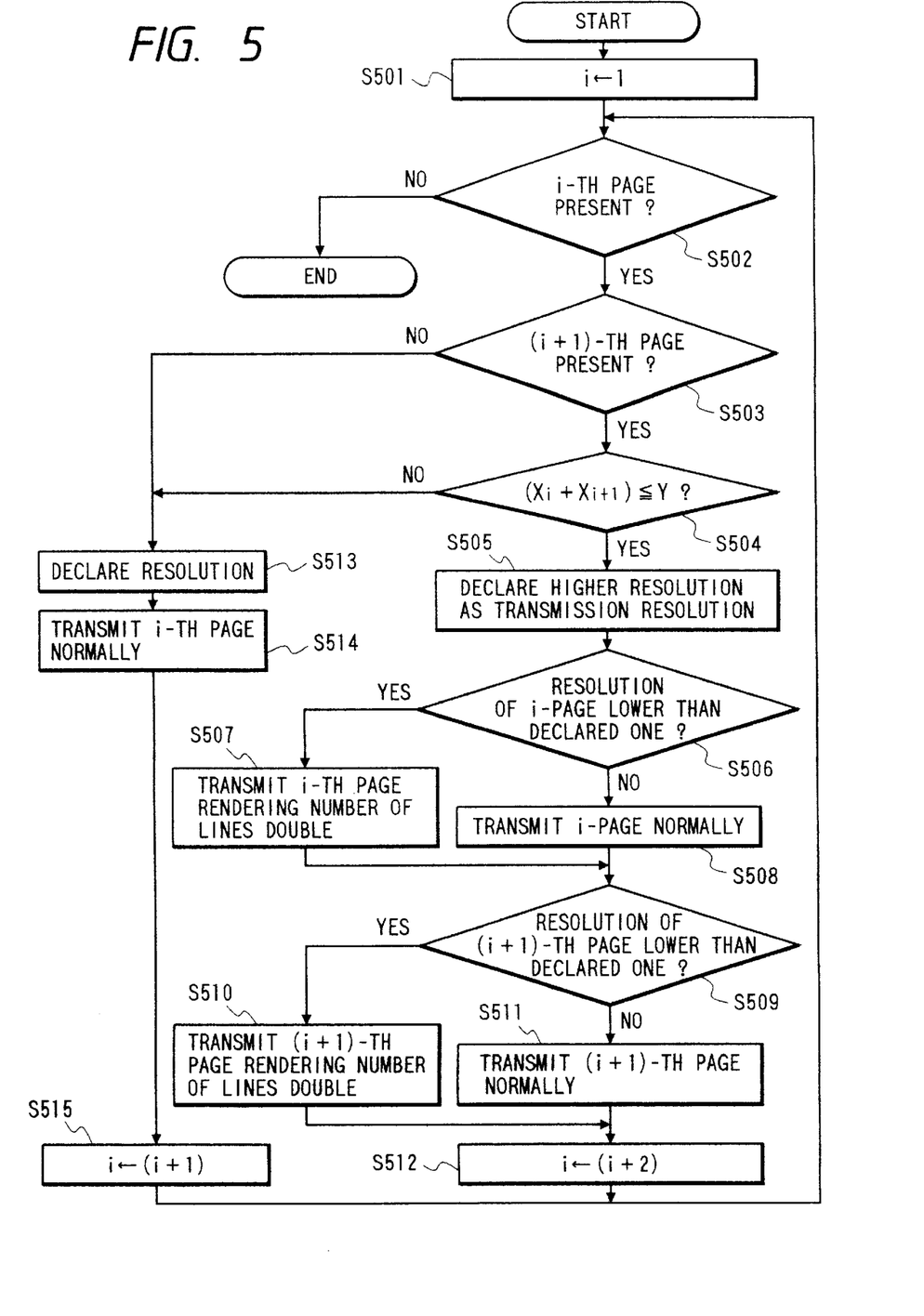
FIG. 5 shows a flow chart of a memory transmission process in a second embodiment of the present invention.

The CPU 1 controls other elements in accordance with various programs preset in the ROM 2 while it executes the binary code control protocol of the ITU-T Recommendation and various processes corresponding to flow charts shown in FIGS. 4 and 5. The CPU 1 uses the first RAM 3 as a work area.

The contact sensor 9 comprises a photo-electric conversion element such as a CCD and converts a document image optically read under control of the read control gate array 10 to an electrical signal and outputs it as image data. The read control gate array 10 compression-codes the image data read by the contact sensor 9 and stores it in the image memory which comprises a DRAM.

As the management information of the image data stored in the image memory 13, an accept number, address information, the number of pages, stored image memory block information, a resolution, an image size and the number of read lines of each page are stored in the second RAM 4 under control of the CPU 1. When the image data is compression-coded, the read control gate array 10 recognizes the number of read lines and outputs it to the CPU 1.

When the image data stored in the image memory 13 is transmitted, the image data is coded and compressed in accordance with a mode of a destination station facsimile apparatus by the coder in the codec 16 under control of the CPU 1, modulated by the modem 14 and outputted to the line N through the network control unit 15. When image data is transmitted, the management information of the image data is read from the second RAM 4 so that it may be simultaneously transmitted, and it is multiplexed with the image data by the multiplexor in the codec 16 for the transmission.

On the other hand, the image data received through the line N and the network control unit 15 is demodulated by the modem 14 under control of the CPU 1, a data error is checked and corrected, decoded and decompressed by the decoder in the codec 16, stored in the image memory 13 and printed out by the laser beam printer 12 under control of the record control gate array 11. The management information received with the image data is demultiplexed by the demultiplexor in the codec 16, stored in the second DRAM 4 and then printed out by the laser printer 12.

While not shown, arranged on the keyboard 8 are a ten-key for entering the address information (FAX number) and various function keys such as a resolution setting key for setting resolutions of standard, fine and super-fine, a start key for indicating the start of transmission and a completion marking key for causing a completion mark indicating the completion of the transmission on a document sheet, and the operation status of those keys is detected by the console panel control gate array 6 and the corresponding input information, setting information and command are stored in the third RAM 5 under control of the CPU 1.

The display 7 comprises a liquid crystal display and the information corresponding to the actuated keys of the keyboard 8 and clock information are displayed by the console panel control gate array 6 under control of the CPU 1.

Figure 2:
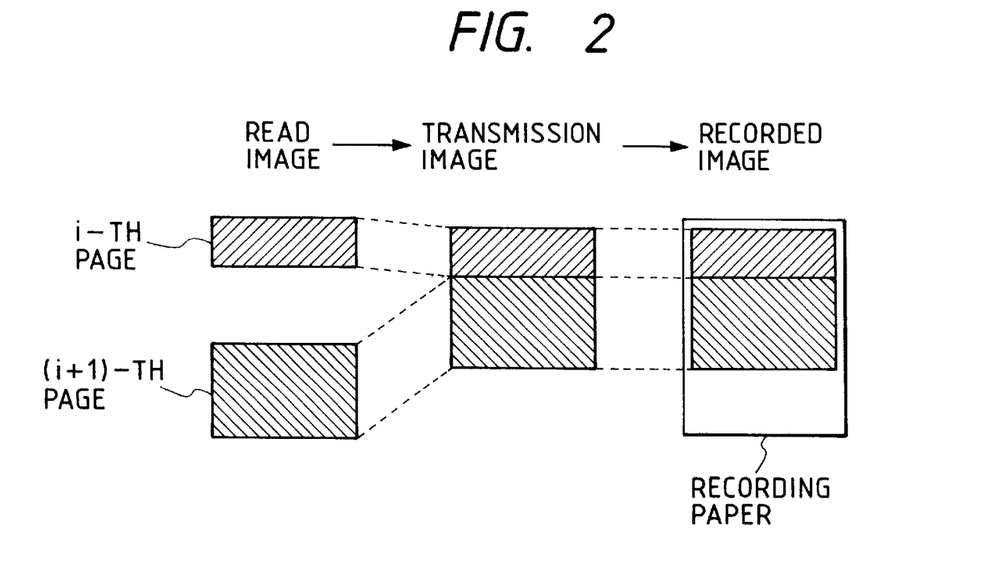
FIG. 2 illustrates combination transmission.
Figure 3:
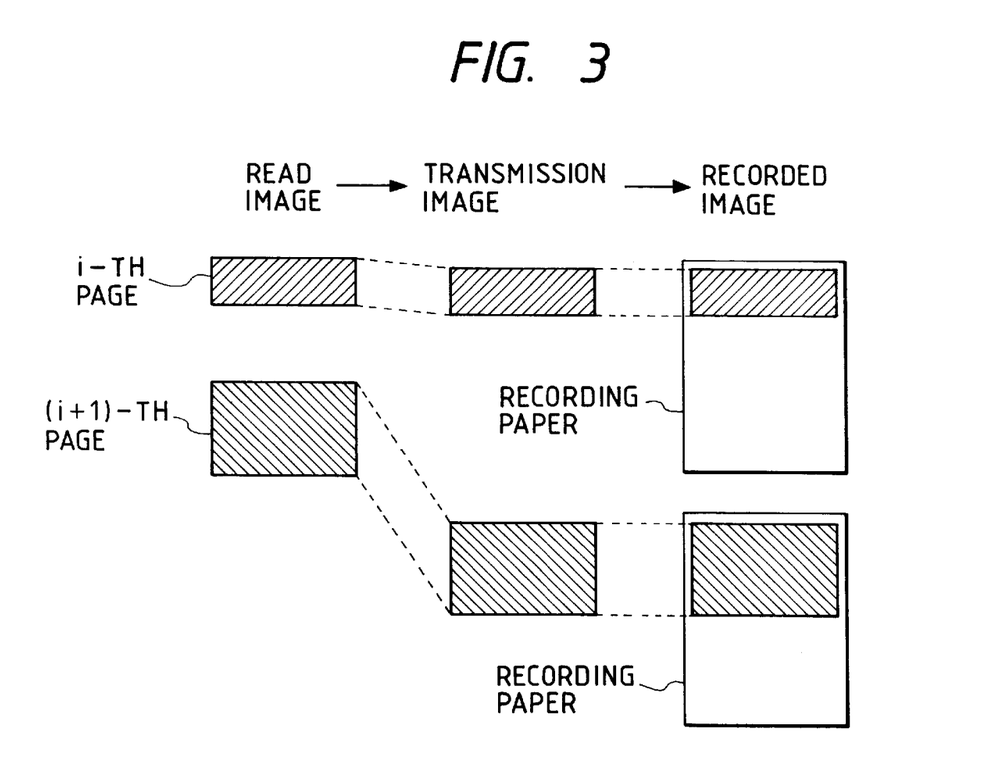
FIG. 3 illustrates transmission without combination.

With the above construction, the facsimile apparatus in accordance with a first embodiment conducts the memory transmission as shown in FIG. 2. Namely, in the first embodiment, when the read image data is temporarily stored in the image memory 13 and transmitted by the accept number, continuous two pages of image data are combined into one page of image data for transmission within a range not exceeding the number of available lines for recording (the length of the record sheet) in the receiving station facsimile apparatus. Namely, When the two page of image data to be combined have the same read resolution, the above combination is conducted to transmit the two pages of image data as one page of image data as shown in FIG. 2. On the other hand, when the read resolutions of the image data of the two pages to be combined are different from each other, the combination is not conducted and the respective pages of image data are transmitted as the independent pages of image data as shown in FIG. 3 so that the combination of the image data of different resolutions as well as the abnormal expansion or reduction of the image at the receiving station are avoided.

In the present invention, the facsimile transmission and reception is conducted by a signal sequence in accordance with the binary code control protocol of the ITU-T Recommendation 30.

The memory transmission in the first embodiment is now explained with reference to a flow chart of FIG. 4. In this flow chart, it is assumed that the read document sheet width (a main scan length of the read image data) is same for all pages.

The CPU 1 first initializes a page counter i to "1" as a page number (step S401). Then, whether the image data of the page identified by the page counter i (hereinafter referred to as i) is stored in the image memory 13 or not is determined (step S402). If the image data of the page i (the i-th page) is stored, the image data of the page i is read from the image memory 13 and transmitted (step S403) and the process proceeds to a step S404. On the other hand, if the image data of the page i is not stored, it means that the transmission of one communication of image data has been fully completed and the process is terminated.

In the step S404, whether the page (i+1) (the (i+1)-th page) image data is stored in the image memory or not is determined. If the page (i+1) image data is not stored, it means that the transmission of one communication of image data has been fully completed and the process is terminated.

On the other hand, if the page (i+1) image data is stored in the image memory 13, whether a sum $(X_i+X_{i+1})$ of a length $X_i$ of the page i document sheet (sub-scan length) and a length $X_{i+1}$ of the page (i+1) document sheet (sub-scan length) is not larger than a record sheet length Y or not is determined (step S405).

The length of the document sheet (sub-scan length) is determined by dividing the number of read (store) lines of each page by a read (store) resolution. For example, the length of the document sheet of the 385-line page stored at the standard resolution (3.85 lines/mm) is determined as 385/3.85=100 mm.

The length Y of the record sheet is determined based on the record sheet size information sent from the transmission destination terminal in the pre-protocol during the communication. For example, the length of the record length is declared by the ninteenth and twentieth bits of a digital initial discrimination signal (DIS signal) sent from the transmission destination terminals as one of three sizes, non-limited, B4 size and A4 size. When the B4 size or the A4 size is declared, the value thereof is used as the record sheet length Y. When the non-limit is declared, the record sheet length is estimated based on the record sheet width declared by the seventeenth and eighteenth bits of the DIS signal. Namely, when the record sheet width is A4, B4 or A3, the record sheet length is estimated as A4 length, B4 length or A3 length, respectively.

In the step S405, if it is determined that the sum $(X_i+X_{i+1})$ of the page i document sheet length (sub-scan length) $X_i$ and the page (i+1) document sheet length (sub-scan length) $X_{i+1}$ is not larger than the record sheet length Y, whether the read (store) resolutions of the page i and the page (i+1) are equal or not is determined (step S406). If the read (store) resolutions are equal, the image data of the page (i+1) is read from the image memory and it is transmitted (step S407). As a result, at the receiving station, two pages of image data are combined and recorded on one record sheet as shown in FIG. 2. Then, the page counter i is incremented by two (step S408) and the process returns to S402.

In the step S405, if it is determined that the sum $(X_i+X_{i+1})$ of the page i document sheet length (sub-scan length) $X_i$ and the page (i+1) document sheet length (sub-scan length) $X_{i+1}$ is larger than the record sheet length Y, and in the step S406, if it is determined that the read (store) resolutions of the page i and the page (i+1) are different, the page counter i is incremented by "1" (step S409) and the process returns to the step S402 so that the two pages of image data ate not combined but the image data of the respective pages are transmitted as the independent one page of image data.

[Embodiment 2]

In the second embodiment, when the read resolutions of the image data of two pages to be combined are different, the image data of the respective pages are not transmitted as the independent pages of image data as they are in the first embodiment. In this embodiment, a higher one of the resolutions of the image data of the two pages to be combined is declared as a transmission resolution, and when the image data of the page having a lower read resolution than the declared transmission resolution is to be transmitted, one line is converted to a plurality of lines in accordance with a difference between the transmission resolution and the read resolution and it is transmitted. In this manner, the two pages of image data are combined into one page of image data for transmission in a manner to avoid the recording of abnormally expanded or reduced image at the receiving station.

Referring to a flow chart of FIG. 5, a memory transmission operation in the second embodiment is explained. In this flow chart, it is assumed that the read document sheet width (a main scan length of the read image data) is same for all pages and the resolution is the standard resolution (3.85 lines/mm) or the high resolution (7.7 lines/mm).

The CPU 1 first initializes the page counter i to "1" as the page number (step S501). Then, whether the image data of the page number identified by the page counter i (hereinafter referred to as i) is stored in the image memory 13 or not is determined (step S502). If the page i image data is not stored in the image memory, it means that the transmission of one communication of image data has been fully completed and the process is terminated.

On the other hand, if the page i image data is stored in the image memory, whether the page (i+1) image data is stored in the image memory 13 or not is determined (step S503). If the page (i+1) image data is stored in the memory, whether the sum $(X_i+X_{i+1})$ of the page i document sheet length (sub-scan length) $X_i$ and the page (i+1) document sheet length (sub-scan length) $X_{i+1}$ is not larger than the record sheet length Y or not is determined (step S504). If it is not larger than the record sheet length Y, a higher one of the read resolutions of the image data of the page i and the page (i+1) is declared as a transmission resolution (step S505). If the read resolutions are equal, the equal read resolution is declared as the transmission resolution.

Then, whether the read resolution of the page i image data is lower than the declared transmission resolution or not is determined (step S506). If the read resolution is lower than the transmission resolution, that is, in the present case where the resolution is assumed either the standard resolution (3.85 line/mm) or the high resolution (7.7 lines/mm), when the transmission resolution is the high resolution and the read resolution is the standard resolution, the number of lines of the page i image data is doubled and it is transmitted (step S507). This communication process is conducted by reading the image data from the image memory 13 one line at a time and repeatedly and continuously transmitting the image data of each line twice (transmit the same line twice).

On the other hand, if the read resolution is lower than the transmission resolution, that is, in the present example where only two resolutions are assumed, when the transmission resolution and the read resolution are the high resolution or the standard resolution, the image data of the page i is transmitted in a normal manner without converting the number of lines (step S508).

After the page i image data has been transmitted in this manner, the same process is conducted for the page (i+1) image data. Namely, whether the read resolution of the page (i+1) image data is lower than the declared transmission resolution or not is determined (step S509). If the read resolution is lower than the transmission resolution, the number of lines of the page (i+1) image data is doubled and it is transmitted (step S510). On the other hand, if the read resolution is not lower than the transmission resolution, the page (i+1) image data is transmitted in the normal manner without converting the number of lines (step S511).

After the transmission of the page (i+1) image data, a return control signal (RTC signal) in the binary code control protocol of the ITU-T Recommendation 30 is transmitted to inform to the communication destination terminal that the image data of the page i and the page (i+1) being read are in one record sheet page of image data. Accordingly, when the sum of the document sheet length (sub-scan length) of the image data to be transmitted is not larger than the record sheet length, the two pages of image data are recorded on one record sheet as shown in FIG. 2. In this case, even if the read resolutions of the image data of the respective pages are different, the abnormal expansion or reduction of the image data of either the page i or the page (i+1) being read is prevented because of the conversion of the number of lines.

After the transmission of the page (i+1) image data, the page counter i is incremented by "2" (step S512) and the process returns to the step S502.

In the step S503, if it is determined that the page (i+1) image data is not stored, and in the step S504, if it is determined that the sum $(X_i+X_{i+1})$ of the page i document sheet length (sub-scan length) $X_i$ and the page (i+1) document sheet length (sub-scan length) $X_{i+1}$ is larger than the record sheet length Y, the read resolution of the page i image data is declared as the transmission resolution (step S513). The page i image data is transmitted in the normal manner without changing the number of lines (step S514).

After the transmission of the page i image data, the return control signal (RTC) in the binary code control protocol of the ITU-T Recommendation 30 is transmitted to inform to the transmission destination terminal that the page i image data being read is one record sheet page of image data. Accordingly, in this case, only the page i image data is recorded on one record sheet.

In this manner, after the transmission of the page i image data, the page counter i is incremented by "1" (step S515) and the process proceeds to the step S502.

As described above, in the first embodiment, when the read resolutions of two pages of image data to be combined are equal, the two pages of image data are combined into one page of image data for transmission so that the blank area of the record sheet is reduced as much as possible and the extra sheet fed for the blank area is not needed and the rapid recording is attained and the running cost is reduced. When the read resolutions are different, the combination is not conducted but the image data of the respective pages are transmitted as the independent pages of image data so that the abnormal expansion or reduction of the image recorded at the receiving station due to the combination of the image data of the different resolutions is avoided.

In the second embodiment, when the read resolutions of the two pages of image data to be combined are different, the image data of the respective pages are not transmitted as the independent pages of image data as they are in the first embodiment but the two pages of image data are combined into one page in such a manner that the abnormal expansion or reduction of the image recorded at the receiving station is avoided and the combined image data is transmitted. Thus, the running cost is further reduced and the recording of the abnormally expanded or reduced image at the receiving station is avoided.

The present application is not limited to the above embodiments. For example, three or more pages of image data may be transmitted as one page of image data. In this case, of the plurality of read image data which can be recorded on one record sheet, the highest one of the read resolutions is declared as the transmission resolution, and as for the image data having lower read resolution than the transmission resolution, the number of lines of the image data having the lower read resolution is converted to a plurality of lines for transmission in accordance with a difference between the transmission resolution and the read resolution, that is, in such a manner that the number of lines of lines of the image data having the lower read resolution is equal to the number of lines of the transmission resolution.

The present invention may also be applied to an apparatus having three or more resolutions including standard, fine and super-fine. Further, before the number of lines is converted, a correction such as smoothing may be conducted.

Further, the transmission control may be applied to not only the input image data read by the CCD scanner but also the image data inputted by a computer. The record sheet length may be recognized by using a non-standard function (NSF signal) without recognizing sheet length by the DIS signal which is the standard function defined by the ITU-T. In this case, a letter size sheet and a legal size sheet used in the north America may be used.

In accordance with the present invention, the direct combination of the image data having different resolutions and the recording thereof on one record sheet while the image is partially expanded or reduced are avoided.

[Third Embodiment]

Figure 6:
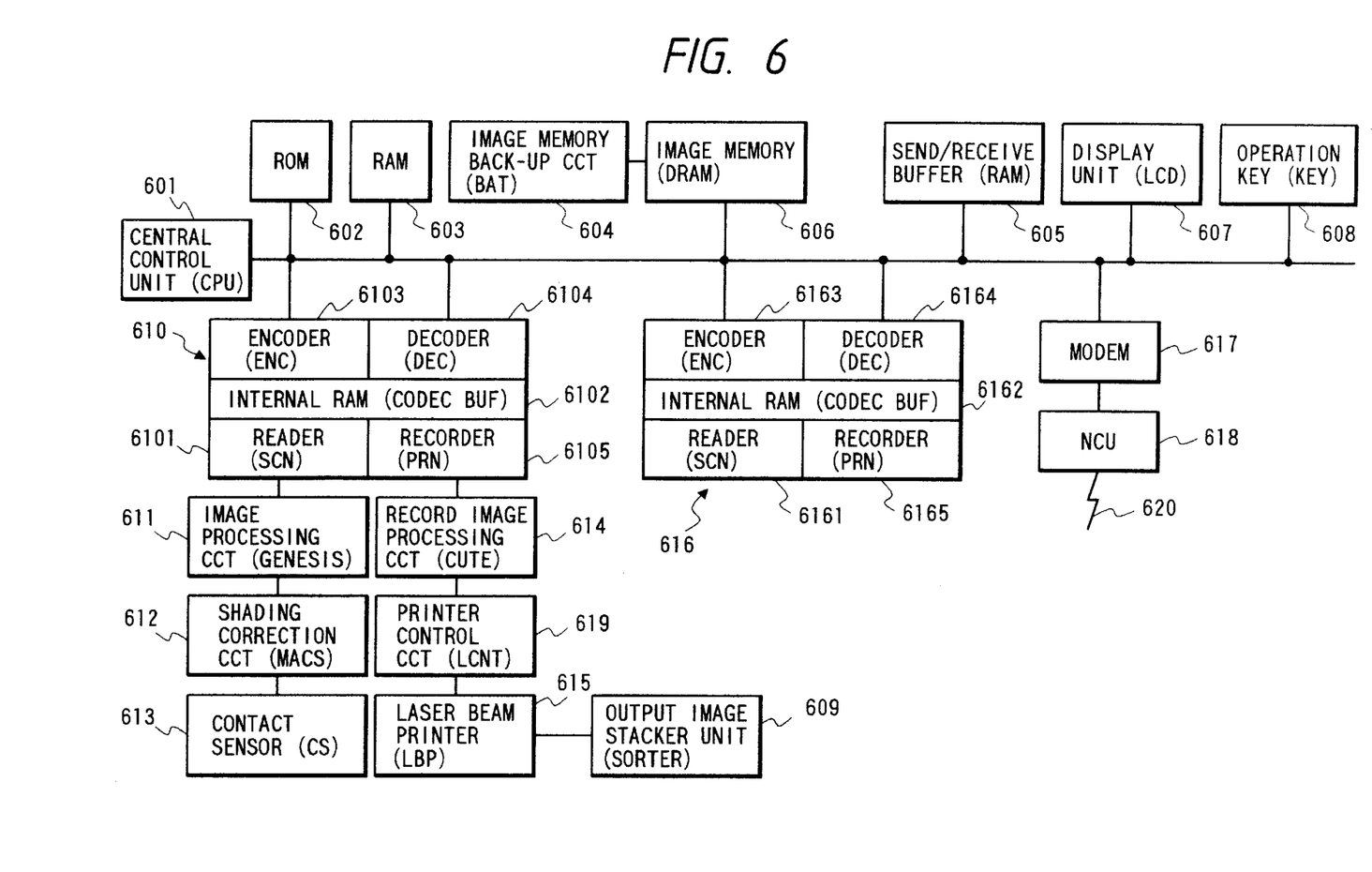
FIG. 6 shows a block diagram of an embodiment of a system configuration of the facsimile apparatus of the present invention.

A third embodiment of the present invention is now explained. FIG. 6 shows a block diagram of the third embodiment of the present invention. Numeral 601 denotes a central processing unit (CPU) for controlling an overall facsimile apparatus, numeral 602 denotes a ROM which stores a program for controlling an operation of the central processing unit 1, numeral 603 denotes a RAM which stores various managing and controlling information necessary to execute the facsimile transmission and reception, numeral 604 denotes an image memory backup circuit (BAT) for supplying a power from a battery to an image memory 606 during power-off, numeral 605 denotes a transmission/reception buffer (RAM) comprising a transmission data buffer for storing transmission data, a reception data buffer for storing received data and a buffer for developing image data, numeral 606 denotes the image memory (DRAM) for storing the image coded data, numeral 607 denotes a display (LCD) for displaying a telephone number and various operation messages, numeral 608 denote keys (KEY) by which an operator enters the telephone number and various commands and settings, and numeral 609 denotes an output image stacker (SORTER) for stacking record sheets ejected from a laser beam printer (LBP) 615.

Numeral 610 denotes a read/write codec device (RW-CODEC) for coding an image signal read by a contact sensor 613 and decoding the coded image data for outputting from the laser beam printer 615, numeral 611 denotes an image processing circuit (GENESIS) for conducting the binarization or image conversion processing to the image data, numeral 612 denotes a correction circuit (MACS) for conducting a shading correction for the image data, numeral 613 denotes a contact sensor (CS) for reading the image on a document sheet, numeral 614 denotes a record image processing circuit (CUTE) for conducting the correction and the conversion process for the image data outputted to the laser printer 615, numeral 615 denotes the laser printer (LBP) for printing out the image data on the record sheet, numeral 616 denotes a communication codec device (C-CODEC) for coding and decoding the transmission or received image data, numeral 617 denotes a modem (MODEM) for modulating the transmission image data and demodulating the received image data, numeral 618 denotes a network control unit (NCU) for conducting the supplement and release control of a line 620, numeral 619 denotes a printer control circuit (LCNT) for controlling the print operation of the laser printer 615, and numeral 620 denotes a line to transmit the modulated image data.

The read/write codec device (RW-CODEC) 610 comprises a reader (SCN) 6101, an internal RAM (CODEC BUF) 6102, an encoder (ENC) 6103, a decoder (DEC) 6104 and a recorder (PRN) 6105. The communication codec device (C-CODEC) 616 comprises a reader (SCN) 6161, an internal RAM (CODEC BUF) 6162, an encoder (ENC) 6163, a decoder (DEC) 6164 and a recorder (PRN) 6165.

An operation of the present embodiment is now explained. The central processing unit 601 controls the entire apparatus in accordance with the content of the program stored in the ROM 602. The program is functionally divided into operation units called tasks and the sequence of execution thereof is managed by a program called an operating system (OS) stored in the ROM 602 so that they are operated quasi-parallelly. The following operation is attained by the respective tasks.

A document sheet read operation is first explained. A document sheet is read by the contact sensor (CS) 613 which produces an image signal representing an image drawn on the document sheet. The resulting image signal is shading-corrected by the correction circuit (MACS) 612 and binarized or image conversion processed by the image processing circuit (GENESIS) 611 and then it is inputted to the reader (SCN) 6101 of the read/write code device (RW-CODEC) 610 as the image data of the document sheet in the form of serial data. The input image data is developed into the internal RAM (CODEC BUF) of the read/write codec device 610, compression-coded by the encoder (ENC) 6103 as the image coded data and then stored in the image memory (DRAM) 606. Management information on the read document sheet such as an accept number, address information, the number of pages, the number of lines of each page, a read width of each page and image storing memory block information are stored in the RAM 603.

A record operation is now explained. The image coded data stored in the image memory 606 by the document sheet read operation described above or the document sheet receive operation to be described later is decompression-coded by the decoder (DEC) 6104 of the read/write codec device 610 and developed into the internal RAM 6102 as the image data. The developed image data is outputted from the recorder (PRN) 6105 in the form of serial data. The output image data is corrected and image-converted by the record image processing circuit (CUTE) 614 and printed out on the record sheet by the laser beam printer (LBP) 615 under control of the printer control circuit (LCNT) 619. The record sheet having the image data recorded thereon is sorted by the type of image and the size and ejected to the output image stacker (SORTER) 609.

The printer control circuit 619 is provided with various types of sensors for detecting an abnormal state during the recording by the laser beam printer 615, an abnormal state of the ejection of the output image stacker 609 and the number of record sheets present during the record transport, so that the jamming of the record sheet, the lack of the ink and the abnormal state in the laser beam printer 615 may be read by the central processing unit (CPU) 601 as the status.

A transmission operation is now explained. The image data stored in the image memory 606 by the document sheet read operation described above is decompression-coded by the decoder (DEC) 6164 of the communication codec device (C-CODEC) 616 and developed into the buffer of the transmission/reception buffer (RAM) 605 as the image data. The developed image data is reduced by the central processing unit 601 as required and then again developed into the buffer. Then, the image data developed in the buffer is coded by the encoder (ENC) 6163 of the communication codec device 616 as the transmission image data and transferred to the transmission buffer of the transmission/reception buffer 605. The transmission data transferred to the transmission buffer is modulated by the modem (MODEM) 617 and sent out on the line 620 through the network control unit (NCU) 618 byte by byte.

A document sheet receive operation is now explained. The received data on the line 620 is applied to the modem 617 through the network control unit 618 and demodulated, and it is transferred to the reception buffer of the transmission/reception buffer 605 byte by byte. The received data transferred to the reception buffer is decompression-coded by the decoder 6164 of the communication codec device 616, image error-checked and developed into the internal RAM (CODEC BUF) 6162 as the image data. The developed image data is compression-coded by the encoder 6163 of the internal RAM 6162 and it is stored in the image memory 606, and the image management information relating to the received data is stored in the RAM 603.

Figure 7:
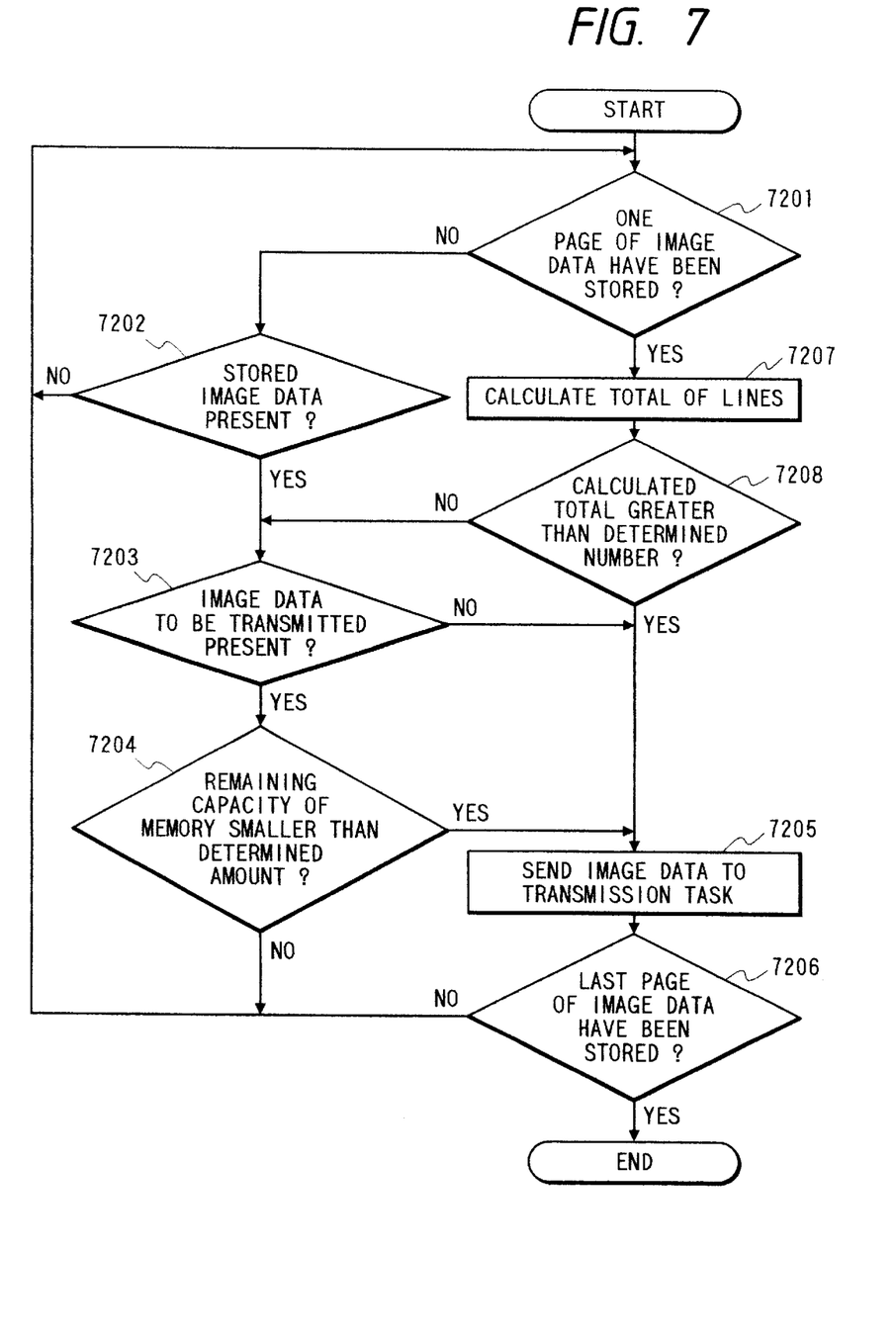
FIG. 7 shows a flow chart of a management task process for controlling a central control unit shown in FIG. 6.

Referring to a flow chart shown in FIG. 7, a control operation for the combination transmission function is explained. First, the operator depresses the keys (KEY) 608 to conduct various commands and settings. When the permission of the combination of pages during the transmission and the number of pages of the document sheets to be combined into one page of transmission image are preset, the contents of the preset are stored in the RAM 603. Since the central processing unit 601 detects the input data from the keys 608 and displays it on the display (LCD) 607, the operator may confirm the contents of setting by the display.

In the control of the combination transmission function, a management task for the combination transmission not shown as well as a read task and a transmission task are parallelly operating on the central processing unit 601, and the read task stores the image data in the image memory 606 until the document sheet to be read by the contact sensor 613 is exhausted or the image memory 606 becomes full. When the image data to be transmitted is delivered to the transmission task, it transmits the image data in accordance with the communication protocol and erases the transmitted image data from the image memory 606 each time the transmission of one page of image data on the communication protocol is completed.

In a step 7201 shown in FIG. 7, the combination transmission management task determines whether the store operation of one page of image coded data (hereinafter referred to as image data) outputted from the encoder (ENC) 6103 of the read/write codec device 610 into the image memory 606 by the read task has been completed or not, and if the operation has not been completed, the process proceeds to a step 7202 to determine whether the image data already stored in the image memory 606 is present or not. If the read document sheet is the first page and the image data already stored in the image memory 606 is not present, the process returns to the step 7201. If the image data already stored is present, the process proceeds to a step 7203. In the step 7203, whether the image data ready for the transmission is present in the image memory 606 or not is determined. If the image data ready for the transmission is not present, the process proceeds to a step 7205, and if the image data ready for the transmission is present, the process proceeds to a step 7204. The image data ready for the transmission means the image data delivered to the transmission task and not transmitted yet. In the step 7204, whether the remaining memory capacity in the image memory 606 is not larger than a predetermined value or not is determined. If it is not greater than the predetermined value, the process proceeds to a step 7205, and if it is larger than the predetermined value indicating a room for the memory capacity, the process returns to the step 7201.

Normally, the management task repeats the steps 7201, 7202, 7203, 7204 and 7201 and waits for the completion of the storing of the image data into the image memory 606 by the read task. However, if the remaining capacity of the image memory 606 decreases in the step 7204 during the waiting of the completion of the storing of the image data and the image memory may become full, the process exits the step 7205 and delivers the image data heretofore stored in the image memory 606 to the transmission task read page by read page so that it is directly transmitted to the transmission destination station, and the image data in the image memory 606 for which the transmission has been completed is erased.

On the other hand, in the step 7201, if it is determined that one page of image data has been stored in the image memory 606, the management task proceeds to a step 7207 to calculate a total number of lines in the sub-scan direction of the image data stored in the image memory 606. In a step 7208, whether the calculated number of lines is not smaller than a predetermined value (an appropriate value not larger than the number of sub-scan lines of one page of image data of the predetermined size cut sheet) or not is determined. (If the receiving station record sheet is declared as the A4 width by the protocol signal, the sub-scan length of one page is the A4 size sub-scan length.)

If the number of lines is smaller than the predetermined value, the image data stored in the image memory 606 and the read image data of the next page may be combined for transmission and the process proceeds to a step 7203. In the step 7203, whether other image data ready for transmission is present in the image memory 606 or not is determined, and if it is not present, the image data to be transmitted is not present and the process proceeds to a step 7205 without waiting for the storage of the next page of image data into the image memory 606 and the image data stored in the image memory 606 is delivered to the transmission task. The transmission task transmits the delivered image data to the transmission destination apparatus as described in the transmission operation, and erases the image data for which the transmission has been completed from the image memory 606.

On the other hand, in the step 7203, if it is determined that other image data ready for transmission is present in the image memory 606, the management task waits for the completion of the storing of the next page of image data into the image memory 606 by the read task, and during the waiting, it examines the available memory capacity (remaining memory capacity) of the image memory 606 in a step 7204, and if the remaining capacity is not larger than the predetermined value, it is determined that the room for the memory capacity of the image memory 606 is lost and the memory may become full, and the process proceeds to a step 7205 to deliver the image data stored in the image memory 606 to the transmission task a read page of the read task at a time without waiting for the storing of the next page of image data to the image memory 606 so that the image data is immediately transmitted page by page and that image data is erased from the image memory 606. Then, in a step 7206, the management task determines whether the last page of the document sheet to be transmitted has been stored in the image memory 606 by the read task or not, and if the image data being read is present, the process returns to the step 7201, and if the last page is stored, the overall process is terminated. On the other hand, in the step 7204, if it is determined that the remaining capacity of the image memory 606 is larger than the predetermined value, the management task returns to the step 7201 and shifts to a step to wait for the storing of the next page of image data into the image memory 606 by the read task.

When the process comprising the steps 7201, 7207, 7208, 7203, 7204 and 7201 is repeated a plurality of times, the read image data having short sub-scan length of a plurality of pages (equal to the number of times of repetitions of the above series of steps) are serially stored in the image memory 606 until a total number of lines in the sub-scan direction of the image data reaches the predetermined value. Then, in a step 7208, when it is determined that the total number of lines of the image data in the image memory 606 is not smaller than the predetermined value, the process proceeds to a step 7205 and the management task delivers the plurality of pages of image data serially stored in the image memory 606 to the transmission task as one page of image data. The transmission task transmits the one page of image data to the transmission destination station as one page of image data on the transmission protocol to conduct the combination transmission of the read image data having the short sub-scan length.

However, when the sub-scan line of the one page of read image data stored in the image memory 606 by the read task is not smaller than the predetermined value for one page, the process comprising the steps 7201, 7207, 7208, 7203, 7204 and 7201 is not conducted but the process exits the step 7208 directly to the step 7205 so that the transmission task conducts the normal transmission of transmitting the one page of image data delivered from the management task to the destination station as one page of image data on the communication protocol.

When the management task conducts the above steps 7201, 7207, 7208, 7203, 7204 and 7201 once to store the one page of read image data having the short sub-scan length into the image memory 606 and then conducts the process comprising the steps 7201, 7207, 7208, 7203 and 7204 and the remaining capacity of the image memory 606 becomes smaller than the predetermined value in the step 7204 and process exits to the step 7205, the management task immediately reads the one page of image data of the image memory 606 and delivers it to the transmission task so that the transmission task immediately transmits the delivered image data to the destination station. As a result, the combination transmission is canceled and the image data having the short sub-scan length which has been transmitted is quickly erased and the full state of the image memory 606 is prevented.

When the management task conducts the process comprising the steps 7201, 7207, 7208, 7203, 7204 and 7201 twice or more to serially store two or more pages of image data having the short sub-scan length into the image memory 606 and then conducts the process comprising the steps of 7201, 7207, 7208, 7203 and 7204 and the remaining capacity of the image memory 606 becomes smaller than the predetermined value in the step 7204 and exits to the step 7205, the management task reads the two or more pages of image data stored in the image memory 606 one read page at a time by the read task and delivers it to the transmission task page by page. Since the transmission task immediately transmits the delivered image data to the destination station page by page on the communication protocol, the combination transmission is again canceled and the two or more pages of image data having the short sub-scan length which have been transmitted are quickly erased so that the full state of the image memory 606 is prevented.

In accordance with the present invention, the remaining memory capacity of the image memory 606 is examined, and if the remaining capacity is larger than the predetermined value, namely, if the memory capacity of the image memory 606 has a room, the combination transmission is conducted to combine a plurality of pages of image data of the transmission document sheet having the short sub-scan length into one page of image data for transmission to the destination station so that the communication time may be shortened. When the remaining memory capacity of the image memory 606 is not larger than the predetermined value, namely if the memory capacity of the image memory has no room, the combination transmission described above is not conducted and the image data stored in the image memory 606 is immediately read page by page for transmission page by page, and the transmitted image data is quickly erased from the image memory 606 so that the full state of the image memory 606 and the transmission disable are avoided and the reliability of the memory transmission is improved. When the transmission destination apparatus uses the cut sheets, the blank may be eliminated from the received document sheet by the combination transmission and the waste of the received document sheet is prevented.

[Fourth Embodiment]

A fourth embodiment of the present invention is now explained. In the present embodiment, only the operation of the management task when the remaining capacity of the image memory is small is different from that of the previous embodiment and the configuration of the apparatus is identical to that of the previous embodiment and the flow of the combination transmission of the management task is substantially same. Accordingly, reference is made to the block diagram of FIG. 6 and the flow chart of FIG. 7 in the following description. In the present embodiment, the management task repeats the process comprising the steps of 7201, 7207, 7208, 7203, 7204 and 7201 a plurality of times to store serially a plurality of pages of read image data having the short sub-scan length into the image memory 606 until a total number of lines in the sub-scan direction of the image data reaches the predetermined value. Then, in the step 7208, if it is determined that the total number of lines of the image data in the image memory 606 is not smaller than the predetermined value, the process proceeds to the step 7205 and the management task of the present embodiment delivers the image data serially stored in the image memory 606 to the transmission task as one page of image data and combines the plurality of read image data having the short sub-scan length into one page for transmission.

When the management task of the present embodiment serially stores two or more pages of read image data having the short sub-scan length into the image memory 606 and the remaining capacity of the image memory 606 becomes smaller than the predetermined value in the step 7204 and the process exits to the step 7205, the management task of the present embodiment reads the two or more pages of image data stored in the image memory 606 as one page of image data unlike the third embodiment, and delivers it into the transmission task. Thus, the transmission task conducts the combination-transmission of the delivered image data to the transmission destination apparatus as one page of image data on the communication protocol and then erases transmitted image data from the image memory 606.

In accordance with the present embodiment, when the remaining capacity becomes smaller than the predetermined value during the combination transmission process, the combination transmission process is canceled on the way and the image data stored in the image memory 606 is transmitted without waiting for the storing of the next page of read document sheet into the image memory 606. When the image data having the short sub-scan length stored in the image memory 606 is for two or more pages, the management task of the present embodiment delivers the two or more pages of image data to the transmission task as one page of image data and conducts the combination transmission to the destination apparatus as one page of image data on the communication protocol. Thus, the transmission process rate of the image data in the image memory is higher than that of the previous embodiment and the image data may be erased from the image memory 606 more quickly and the possibility of the full state of the image memory 606 is more securely prevented. Other configuration and operation are identical to those of the third embodiment and the same effects are offered by the present embodiment.

In accordance with the third and fourth embodiments, a plurality of pages of image data are stored in the memory means and the plurality of pages of image data are combined for transmission to shorten the communication time. Further, when the available remaining capacity of the memory means becomes smaller than the predetermined value, the image data already stored in the memory means is transmitted to the destination apparatus and the transmitted image data is erased from the memory means so that the full state of the memory means and the transmission disable are minimized.

What is claimed is:

1. A communication apparatus capable of transmitting image data after notifying a transmission destination terminal of a resolution of the image data to be transmitted, said communication apparatus comprising:

first recognition means for recognizing a number of input lines and an input resolution for each page of a plurality of pages of image data inputted by an image input unit;

second recognition means for recognizing a number of available lines for recording per page at the transmission destination terminal when the plurality of pages of image data inputted by the image input unit are transmitted; and transmission control means for combining a plurality of continuous pages of image data into one page of image data for transmission within a range in which a total number of input lines of the plurality of continuous pages recognized by said first recognition means does not exceed the number of available lines for recording recognized by said second recognition means when the input resolutions of the plurality of continuous pages of image data recognized by said first recognition means are equal, and transmitting the plurality of continuous pages of image data without combining the image data when the input resolutions are different among the pages, such that the resolution notified to the transmission destination terminal does not result in improper expansion or reduction at the transmission destination terminal.

2. A communication apparatus capable of transmitting image data after notifying a transmission destination terminal of a transmission resolution of the image data to be transmitted, said communication apparatus comprising:

first recognition means for recognizing a number of input lines and an input resolution for each page of a plurality of pages of image data inputted by an image input unit;

second recognition means for recognizing a number of available lines for recording per page at the transmission destination terminal when the plurality of pages of image data inputted by the image input unit are transmitted; and transmission control means for, when a plurality of continuous pages of image data are combined into one page of image data for transmission within a range in which a total number of input lines of the plurality of continuous pages recognized by said first recognition means does not exceed the number of available lines for recording recognized by said second recognition means, declaring a highest one of the input resolutions of the plurality of continuous pages of image data to be combined recognized by said first recognition means as the transmission resolution notified to the transmission destination terminal when the input resolutions are different, and converting the image data having lower input resolutions than the transmission resolution to the transmission resolution for transmission, such that the transmission resolution notified to the transmission destination terminal does not result in improper expansion or reduction at the transmission destination terminal.

3. A communication apparatus according to claim 2, wherein said transmission control means repeatedly transmits the image data of each line by a number of times corresponding to a difference between the input resolution and the transmission resolution during a conversion process.

4. A communication apparatus according to claim 2, wherein said transmission control means conducts smoothing correction when the image data of each line is serially transmitted.

5. A communication apparatus according to claim 1 or 2, wherein said transmission control means combines two continuous pages of image data into one page of image data for transmission within a range in which the number of input lines recognized by said first recognition means does not exceed the number of available lines for recording recognized by said second recognition means.

6. A communication apparatus according to claim 1 or 2, wherein said transmission control means combines three or more continuous pages of image data into one page of image data for transmission within a range in which the number of input lines recognized by said first recognition means does not exceed the number of available lines for recording recognized by said second recognition means.

7. A communication apparatus according to claim 1 or 2, wherein said second recognition means recognizes the number of available lines for recording per page of the transmission destination terminal in accordance with a standard DIS signal defined by an ITU-T Recommendation.

8. A communication apparatus according to claim 1 or 2, wherein said second recognition means recognizes the number of available lines for recording per page of the transmission destination terminal in accordance with a non-standard NSF signal defined by an ITU-T Recommendation.

9. A communication apparatus according to claim 1 or 2, wherein the image input unit comprises an image reading unit, such as a CCD scanner.

10. A communication apparatus according to claim 1 or 2, wherein said communication apparatus is a facsimile apparatus.

11. A communication method of transmitting image data after notifying a transmission destination terminal of a resolution of the image data to be transmitted, said method comprising:

a first recognition step of recognizing a number of input lines and an input resolution for each page of a plurality of pages of image data inputted by an image input unit;

a second recognition step of recognizing a number of available lines for recording per page at the transmission destination terminal when the plurality of pages of image data inputted by the image input unit are transmitted; and a transmission control step of combining a plurality of continuous pages of image data into one page of image data for transmission within a range in which a total number of input lines of the plurality of continuous pages recognized in said first recognition step does not exceed the number of available lines for recording recognized in said second recognition step when the input resolutions of the plurality of continuous pages of image data recognized in said first recognition step are equal, and transmitting the plurality of continuous pages of image data without combining the image data when the input resolutions are different among the pages, such that the resolution notified to the transmission destination terminal does not result in improper expansion or reduction at the transmission destination terminal.

12. A communication method of transmitting image data after notifying a transmission destination terminal of a transmission resolution of the image data to be transmitted, said method comprising:

a first recognition step of recognizing a number of input lines and an input resolution for each page of a plurality of pages of image data inputted by an image input unit;

a second recognition step of recognizing a number of available lines for recording per page at the transmission destination terminal when the plurality of pages of image data inputted by the image input unit are transmitted; and a transmission control step of, when a plurality of continuous pages of image data are combined into one page of image data for transmission within a range in which a total number of input lines of the plurality of continuous pages recognized in said first recognition step does not exceed the number of available lines for recording recognized in said second recognition step, declaring a highest one of the input resolutions of the plurality of continuous pages of image data to be combined recognized in said first recognition step as the transmission resolution notified to the transmission destination terminal when the input resolutions are different, and converting the image data having lower input resolutions than the transmission resolution to the transmission resolution for transmission, such that the transmission resolution notified to the transmission destination terminal does not result in improper expansion or reduction at the transmission destination terminal.

\* \* \* \* \*

UNITED STATES PATENT AND TRADEMARK OFFICE
CERTIFICATE OF CORRECTION

PATENT NO.    : 6,417,935 B1
DATED         : July 9, 2002
INVENTOR(S)   : Hitoshi Saito et al.

It is certified that error appears in the above-identified patent and that said Letters Patent is hereby corrected as shown below:

<u>Title page,</u>
Item [*], Notice, insert: -- [*] This patent issued on a continued prosecution application filed under 37 CFR 1.53(d), and is subject to the twenty year patent term provisions of 35 U.S.C. 154(a)(2). --.

Signed and Sealed this

Seventeenth Day of December, 2002

JAMES E. ROGAN
*Director of the United States Patent and Trademark Office*